United States Patent
Ramani et al.

(10) Patent No.: US 8,924,850 B1
(45) Date of Patent: Dec. 30, 2014

(54) SPEEDING UP DOCUMENT LOADING

(71) Applicant: Google Inc., Mountain View, CA (US)

(72) Inventors: Ramkumar Ramani, Cupertino, CA (US); Robert J. Ennals, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/086,041

(22) Filed: Nov. 21, 2013

(51) Int. Cl.
*G06F 17/00* (2006.01)
*G06F 17/22* (2006.01)

(52) U.S. Cl.
CPC .................................. *G06F 17/2247* (2013.01)
USPC ............ 715/248; 715/234; 715/235; 715/243

(58) Field of Classification Search
CPC ............ G06F 17/2247; G06F 17/3089; G06F 17/212; G06F 17/248
USPC .................................. 715/234, 235, 243, 248
See application file for complete search history.

(56) References Cited

U.S. PATENT DOCUMENTS

| | | | |
|---|---|---|---|
| 6,023,714 A * | 2/2000 | Hill et al. ..................... | 715/235 |
| 6,237,030 B1 | 5/2001 | Adams | |
| 6,252,597 B1 | 6/2001 | Lokuge | |
| 6,535,888 B1 | 3/2003 | Vijayan | |
| 6,594,670 B1 | 7/2003 | Genser | |
| 6,598,043 B1 | 7/2003 | Baclawski | |
| 6,665,836 B1 | 12/2003 | Wynblatt | |
| 6,758,394 B2 | 7/2004 | Maskatiya | |
| 6,763,351 B1 | 7/2004 | Subramaniam | |
| 6,785,670 B1 | 8/2004 | Chiang | |
| 6,961,731 B2 | 11/2005 | Holbrook | |
| 7,039,875 B2 | 5/2006 | Khalfay | |
| 7,076,743 B2 | 7/2006 | Ingram | |
| 7,162,493 B2 | 1/2007 | Weiss | |
| 7,228,506 B2 | 6/2007 | Ivanovic | |
| 7,299,222 B1 | 11/2007 | Hogan | |
| 7,370,036 B2 | 5/2008 | Vedula | |

(Continued)

FOREIGN PATENT DOCUMENTS

| | | |
|---|---|---|
| WO | WO0219172 A1 | 3/2002 |
| WO | WO2006001920 A1 | 1/2006 |
| WO | WO2007059503 A1 | 5/2007 |
| WO | WO2008003699 A1 | 1/2008 |

OTHER PUBLICATIONS

Tobin Titus et al, w3c Editors Draft Resource Priorities, Feb. 11, 2013, pp. 1-13 https://dvcs.w3.org/hg/webperf/raw-file/tip/specs/ResourcePriorities/Overview.html.*

(Continued)

*Primary Examiner* — Chau Nguyen
*Assistant Examiner* — Howard Cortes
(74) *Attorney, Agent, or Firm* — Fish & Richardson P.C.

(57) ABSTRACT

Methods, systems, and apparatus, including computer programs encoded on a computer storage medium, for speeding up document loading. In some implementations, a resource of a document is requested from a first source, and metadata for the document is requested from a second source that is different from the first source. The requested metadata is received from the second source, and the requested resource is received from the first source. A first representation of the document based on the received metadata is provided for display. After providing the first representation, a second representation of the document that combines portions of the first representation with additional portions of the document is generated, and the second representation is provided for display.

26 Claims, 8 Drawing Sheets

(56) References Cited

U.S. PATENT DOCUMENTS

| | | |
|---|---|---|
| 7,421,432 B1 | 9/2008 | Hoelzle |
| 7,493,315 B2 | 2/2009 | Holbrook |
| 7,546,538 B2 | 6/2009 | Shuping |
| 7,669,142 B2 | 2/2010 | Ray |
| 7,680,810 B2 | 3/2010 | Marcjan |
| 7,725,405 B2 | 5/2010 | Johnson |
| 7,890,856 B2 | 2/2011 | Chiang |
| 7,899,803 B2 | 3/2011 | Cotter |
| 8,041,709 B2 | 10/2011 | Permandla |
| 8,103,742 B1 | 1/2012 | Green |
| 8,171,398 B2 | 5/2012 | Hosotsubo |
| 2002/0010623 A1 | 1/2002 | McCollom |
| 2002/0042799 A1 | 4/2002 | Slotznick |
| 2002/0118214 A1 | 8/2002 | Card |
| 2002/0133566 A1 | 9/2002 | Teeple |
| 2002/0194162 A1 | 12/2002 | Rios |
| 2003/0046259 A1 | 3/2003 | Manrique |
| 2003/0053091 A1 | 3/2003 | Tanaka |
| 2003/0146937 A1 | 8/2003 | Lee |
| 2003/0146939 A1 | 8/2003 | Petropoulos |
| 2003/0169293 A1 | 9/2003 | Savage |
| 2003/0237052 A1 | 12/2003 | Danielsson |
| 2004/0017393 A1 | 1/2004 | Easwar |
| 2004/0090464 A1 | 5/2004 | Shake |
| 2004/0203854 A1 | 10/2004 | Nowak |
| 2004/0205514 A1 | 10/2004 | Sommerer |
| 2004/0205638 A1 | 10/2004 | Thomas |
| 2004/0205715 A1 | 10/2004 | Taylor |
| 2004/0225922 A1 | 11/2004 | Susarla |
| 2004/0255233 A1 | 12/2004 | Croney |
| 2005/0240391 A1 | 10/2005 | Lekutai |
| 2005/0261891 A1 | 11/2005 | Chan |
| 2005/0278314 A1 | 12/2005 | Buchheit |
| 2006/0048051 A1 | 3/2006 | Lazaridis |
| 2006/0059418 A1 | 3/2006 | Elkady |
| 2006/0069670 A1 | 3/2006 | Khaliq |
| 2006/0074868 A1 | 4/2006 | Khaliq |
| 2006/0085741 A1 | 4/2006 | Weiner |
| 2006/0095424 A1 | 5/2006 | Petropoulos |
| 2006/0173824 A1 | 8/2006 | Bensky |
| 2006/0200455 A1 | 9/2006 | Wilson |
| 2006/0200767 A1 | 9/2006 | Glaeske |
| 2006/0248078 A1 | 11/2006 | Gross |
| 2006/0294476 A1 | 12/2006 | Buckley |
| 2007/0118640 A1 | 5/2007 | Subramanian |
| 2007/0260635 A1 | 11/2007 | Ramer |
| 2008/0010387 A1 | 1/2008 | Curtis |
| 2008/0018658 A1 | 1/2008 | Bruno |
| 2008/0019281 A1* | 1/2008 | Liger et al. ............... 370/252 |
| 2008/0071739 A1 | 3/2008 | Kumar |
| 2008/0288459 A1 | 11/2008 | Kim |
| 2008/0288515 A1 | 11/2008 | Kim |
| 2009/0043689 A1 | 2/2009 | Yang |
| 2009/0049062 A1 | 2/2009 | Chitrapura |
| 2009/0307188 A1 | 12/2009 | Oldham et al. |
| 2010/0199197 A1 | 8/2010 | Faletski |
| 2010/0211893 A1 | 8/2010 | Fanning |
| 2010/0223322 A1* | 9/2010 | Mott et al. ............... 709/203 |
| 2011/0029641 A1 | 2/2011 | Fainberg |
| 2011/0055023 A1 | 3/2011 | McNeeley |
| 2011/0063310 A1* | 3/2011 | Iwade et al. ............... 345/522 |
| 2011/0145321 A1* | 6/2011 | Jiang ............... 709/203 |
| 2011/0231386 A1 | 9/2011 | Wang |
| 2012/0036264 A1* | 2/2012 | Jiang et al. ............... 709/226 |
| 2012/0041980 A1* | 2/2012 | Jiang et al. ............... 707/780 |
| 2012/0066586 A1 | 3/2012 | Shemesh |
| 2012/0110437 A1 | 5/2012 | Pan |
| 2012/0159307 A1 | 6/2012 | Chung |
| 2012/0194519 A1 | 8/2012 | Bissell |
| 2012/0204094 A1 | 8/2012 | Liang |
| 2013/0212465 A1 | 8/2013 | Kovatch |
| 2013/0219024 A1* | 8/2013 | Flack ............... 709/219 |

OTHER PUBLICATIONS

Google Developers, Make the Web Faster—Optimize Browser Rendering, May 5, 2012, pp. 1-10 http://web.archive.org/web/20120505144628/https://developers.google.com/speed/docs/best-practices/rendering.*

"Content Delivery Network," downloaded from the Internet on Nov. 20, 2013, 7 pages, http://en.wikipedia.org/wiki/Content_delivery_network.

"Minimize round-trip times," Aug. 23, 2012, accessed from https://developers.google.com/speed/docs/best-practices/rtt, 2 pages.

Announcing Instant Pages, Google Webmaster Central Blog, Jun. 14, 2011, downloaded from the internet on Jan. 24, 2013, 5 pages, www.googlewebmastercentral.blogspot.com/2011/06/announcing-instant-pages.html.

Browster: "Browse Search Results Instantly!" www.browster.com; Mar. 16, 2006 (print date), 8 pages.

Dan Farber: "Browsing at 2x Normal Speed"; http://blogs.zdnet.com/BTL; Feb. 14, 2005, 2 pages.

Google's New Instant Pages Feature to Pre-Load Search Results, downloaded from the internet on Jan. 24, 2013, 2 pages, www.examiner.com/article/google-s-new-instant-pages-feature-to-pre-load-search-results.

How Browsers Work, Behind the Scenes of Modern Web Browsers, downloaded from the internet on Sep. 29, 2012, 26 pages, www.taligarsiel.com/Projects/howbrowserswork1.htm#The_render_tree_relation_to_the_DOM_tree.

Jou, Chichang, A Semantics-Based Mobile Web Content Transcoding Framework, Recent Advances in Wireless Communications and Networks, Prof. Jia-Chin Lin (Ed.) 2011, 19 pages, InTech, Available from: http://www.intechopen.com/books/recent-advances-in-wireless-communications-and-networks/a-semantics-based-mobile-web-content-transcoding-framework.

Knocking Down Barriers to Knowledge, Google Official Blog, Jun. 14, 2011, downloaded from the internet on Jan. 24, 2013, 4 pages, www.googleblog.blogspot.com/2011/06/knocking-down-barriers-to-knowledge.html.

Roberts et al., "Visual Bracketing for Web Search Result Visualization", Proceedings of Information Visualization (IV03), pp. 264-269, IEEE Computer Society, Jul. 2003.

SADIe: Structural-Semantics for Accessibility and Device Independence, downloaded from the internet on Sep. 22, 2012, 2 pages, www.wel.cs.manchester.ac.uk/research/sadie/.

ViewFour.com—ViewSmart, downloaded from the internet on Jan. 24, 2013, 5 pages, http://download.cnet.com/ViewFour-com-ViewSmart/3000-8022_4-10391975.html.

Xiaoming Li et al., "Search Engine: Principles, Techniques and Systems", Science Publishing House, Apr. 2005, 19 pages. (English description included).

Javascript—Using Document.InnerHTML to Dynamically Generate Form Within DIV Tag-Stack Overflow, downloaded from the internet on Jan. 24, 2013, 3 pages, www.stackoverflow.com/questions/5387487/using-document-innerhtml-to-dynamically-generate-form-within-div-tag.

"I Need the innerHTML of a div tag and so far it is impossible to get," The Official Microsoft ASP.Net Forum, downloaded from the internet on Oct. 3, 2012, 4 pages, www.forums.asp.net/t/1105081.aspx.

Sampling Statistics, from Wikipedia, the free encyclopedia, downloaded from the internet on Sep. 29, 2012, 15 pages, www.en.wikipedia.org/wiki/Sampling_(statistics)#Sampling_methods.

Javascript Tutorial—innerHTML, downloaded from the internet on Oct. 3, 2012, 2 pages, www.tizag.com/javascriptT/javascript-innerHTML.php.

Mahdavi, Mehregan et al., "Web Transcoding for Mobile Devices Using a Tag-Based Technique," World Appl. Sci. J., 10 (Special Issue of Comp. & Elect. Eng.), pp. 49-58, 2010.

Office Action issued in U.S. Appl. No. 13/752,599 on May 7, 2013, 17 pages.

Office Action issued in U.S. Appl. No. 13/752,599 on Sep. 30, 2013, 23 pages.

(56) References Cited

OTHER PUBLICATIONS

Office Action issued in U.S. Appl. No. 13/752,599 on Sep. 30, 2013, 17 pages.
Office Action issued in U.S. Appl. No. 13/752,599 on Feb. 24, 2014, 31 pages.
International Search Report and Written Opinion in International Application No. PCT/US2013/063500, mailed Oct. 22, 2014, 13 pages.
Notice of Allowance issued in U.S. Appl. No. 13/752,599 on Oct. 14, 2014, 13 pages.

* cited by examiner

SPEEDING UP DOCUMENT LOADING

TECHNICAL FIELD

This specification generally describes technology for speeding up document loading.

BACKGROUND

Many types of electronic devices access web pages and other documents over networks, such as the Internet. A single document may include content from multiple resources. For example, a URL for a document may identify a HyperText Markup Language (HTML) file, and the HTML file may reference additional components, such as style sheets, images, advertisements, other HTML files to be displayed in in-line frames, and other components. There is often a significant delay between the time a user requests a document with a web browser and the time that a useful view of the document is displayed.

SUMMARY

To speed up the presentation of a document to a user, a device can request the document over a network and also request metadata, such as layout or formatting information for the document, from another source. The metadata can allow the device to determine an accurate layout for the document early in the process of rendering the document.

Often, the process of loading a document involves discovering components of the document one by one. When components of a document are discovered sequentially, the discovery of each new component may introduce additional delays as the new component is identified, fetched, and processed. In many instances, processing a component reveals that yet additional components must be fetched and processed to complete the rendering of the document. As new components of the document are discovered and processed, the web browser may repeatedly change the displayed view of the document. The repositioning and resizing of elements in the document, which is often referred to as "reflow," can shift content in a manner that hinders users' consumption of displayed content while components of the document are still being retrieved and processed.

To reduce delays in presenting documents to users, metadata indicating layout, formatting, or other information about a document can be provided before the information can typically be computed during conventional resource discovery. Before a client device attempts to load a document, a computing system can analyze the document to identify or generate metadata that can speed up presentation of the document. For example, the computing system can identify and extract the portions of various cascading style sheets (CSS) that are needed to render the document. The computing system can also determine, for example, the final sizes and positions of elements in the document after the document is fully rendered and scripts in the document have been interpreted. The identified portions of CSS files and the sizes and positions of elements can be stored as metadata corresponding to the document, and can be provided in response to requests by client devices. Because the layout of a document does not change as frequently as the text, images, or other content of the page, the metadata will often provide accurate information about the layout of the document, even after the content provider alters the content of the page.

When a client device navigates to the document, a web browser of the client device may request the document over a network. The web browser may also separately request metadata for speeding up presentation of the document. For example, the web browser may send a request to a metadata service, where the request includes the Universal Resource Locator (URL) of the document being loaded. The metadata service can then provide the metadata that was previously generated and stored for the document. Because the web browser can request metadata for the document before identifying the specific resources or embedded components referenced within the document, the metadata can be requested before any portion of the document is received and processed. As a result, by the time the web browser receives or processes an HTML file or other portion of the document, the metadata indicating characteristics of the layout of the document can already be present at the client device. Using the metadata, the web browser can provide early views of the document with an accurate layout and formatting even while additional components of the document are still being discovered, downloaded, and processed.

In some implementations, a referring web page that includes a link to a landing page can include metadata for speeding up loading of the landing page. When the referring page is loaded, the metadata for the landing page is automatically retrieved. When a user interacts with the link in the referring page, the user's client device already has metadata for the landing page and can quickly provide a view of the landing page. In some implementations, the referring page is a search engine results page that includes links to search result documents. The referring page may include metadata for speeding up loading of one or more of the search result documents. In addition, or as an alternative, the referring page may cause metadata for the search result documents to be retrieved prior to, or in response to, user interaction with links to the search result documents.

In a general aspect, a method includes: requesting a resource of a document from a first source; before receiving the requested resource, requesting metadata for the document from a second source that is different from the first source; receiving the requested metadata for the document from the second source; receiving the requested resource of the document from the first source; providing, for display, a first representation of the document based on the received metadata from the second source; and after providing, for display, the first representation of the document based on the metadata from the second source: (i) generating a second representation that combines portions of the first representation with additional portions of the document; and (ii) providing, for display, the second representation that combines portions of the first representation with the additional portions of the document.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, requesting metadata for the document from the second source that is different from the first source includes requesting metadata for the document from a second source that is not identified by resources of the document. Providing, for display, the first representation of the document based on the received metadata from the second source includes: providing a first representation of the document that includes a displayable element indicated from the received resource of the document at a position and size indicated by the metadata received from the second source. Providing, for display, the first representation of the document based on the received metadata from the second source includes: determining, based on the received metadata, a region for display of an element of the document, before receiving resources of the document that indicate the region for display of the element; and providing the first representation of the document that reserves a region of the representation for the element. Generating the second representation that combines portions of the first representation with the additional portions of the document includes: generating a second representation that adds an additional displayable element of the document in a position and size indicated by the received metadata from the second source.

Implementations may include one or more of the following features. For example, receiving the requested metadata for the document from the second source includes receiving metadata that includes style data from a cascading style sheet resource, the style data includes data in the cascading style sheet resource for one or more styles that are used in the document, and the style data excludes data in the cascading style sheet resource for one or more styles that are not used in the document. Receiving the requested metadata for the document from the second source includes receiving data from a font resource of the document. Receiving the requested metadata for the document from the second source includes receiving, at a client device, data indicating characteristics of the layout or formatting of a rendering of the document by a device different from the client device. The document includes JavaScript content that, when processed, affects the layout of one or more elements of the document. Receiving the requested metadata for the document from the second source includes receiving data indicating a layout of the one or more elements that reflects the effects of processing the JavaScript content. Receiving the requested metadata for the document from the second source includes receiving data indicating a location of a fold of the document. The method includes: based on the data indicating the location of the fold of the document, identifying content for display in an above-the-fold region of the document; and prioritizing processing of the content of the document such that the identified content for display in the above-the-fold region is processed before processing content for display outside the above-the-fold region.

The details of one or more implementations of the subject matter described in this specification are set forth in the accompanying drawings and the description below. Other potential features, aspects, and advantages of the subject matter will become apparent from the description, the drawings, and/or the claims.

BRIEF DESCRIPTION OF DRAWINGS

Like reference symbols in the various drawings indicate like elements.

DETAILED DESCRIPTION

Figure 1:
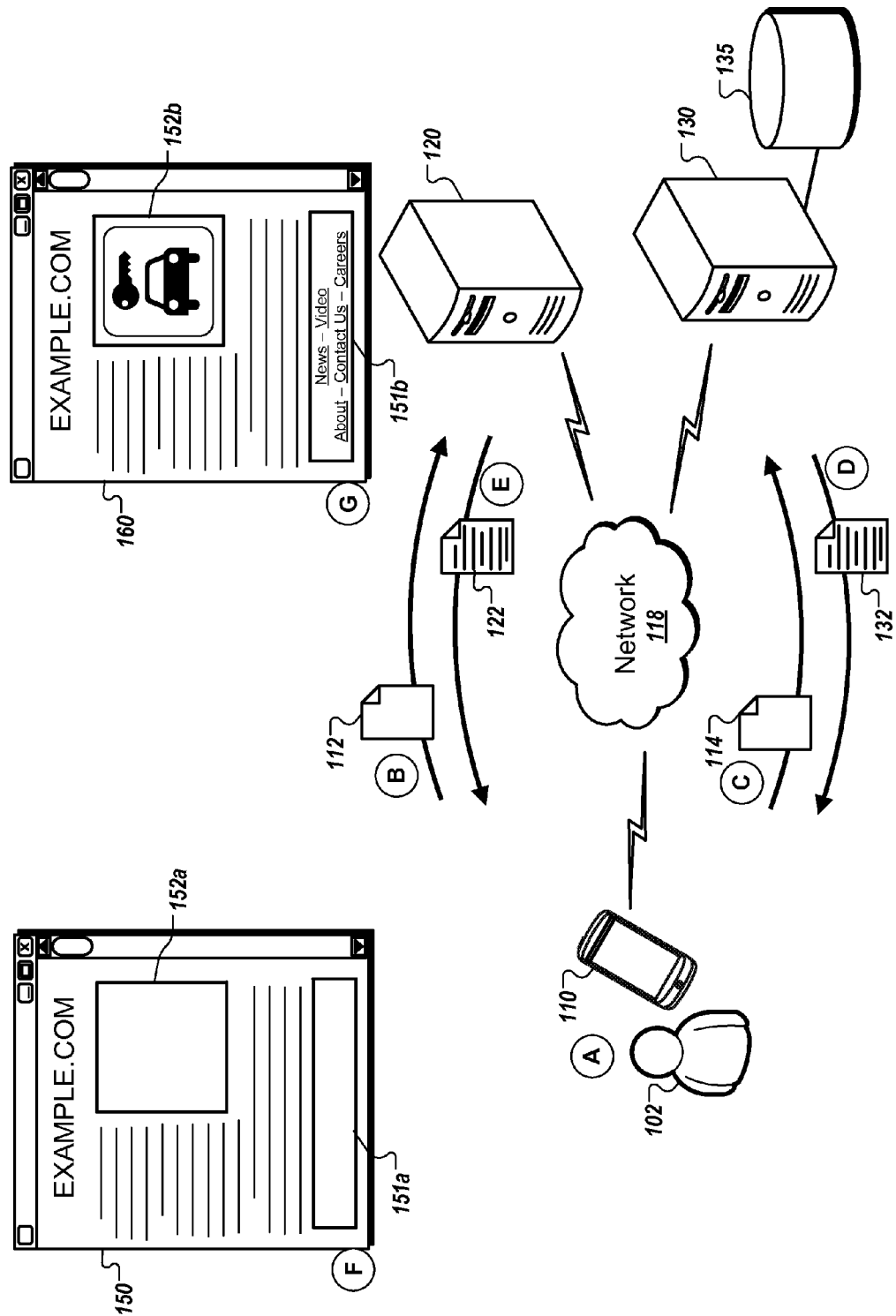
FIG. 1 is a block diagram that illustrates an example of a system for speeding up document loading.

FIG. 1 is a block diagram that illustrates an example of a system 100 for speeding up document loading. The system 100 includes a client device 110, a first computing system 120, a second computing system 130, and a network 118. The figure shows stages (A) to (E) which illustrate a flow of data, and stages (E) and (F) which illustrate user interfaces shown on the client device 110.

In the example, a user 102 loads a document in a web browser of the client device 110. The web browser requests the document from the computing system 120. Before receiving the document, the web browser also requests data for speeding up loading of the document, referred to generally as metadata or acceleration data, from the computing system 130. The web browser uses the content of the document and independently provided metadata to quickly provide the user 102 a view of the document. In some implementations, the requested metadata allows the web browser to reduce or avoid reflow when displaying the document. The requested metadata may also allow the web browser to provide a meaningful view of the document (e.g., with accurate formatting and layout) earlier than the web browser could provide by processing the content of the document alone.

The client device 110 can be, for example, a desktop computer, a laptop computer, a cellular phone, a smart phone, a tablet computer, a music player, an e-book reader, a navigation system, or other device. The functions performed by each of the computing systems 120, 130 can be performed by individual computer systems or can be distributed across multiple computer systems. The network 118 can be wired or wireless or a combination of both, and may include private networks and/or public networks, such as the Internet.

Many web pages and other documents include content that is spread among multiple files. The URL for a document may correspond to a first file, such as an HTML file. The HTML file may reference one or more embedded components that must be downloaded to complete the document. For example, examples of embedded components include fonts, script files, CSS files, images, web applications, media files, and other HTML files.

As used herein, a "document" or "web page" refers generally to the set of resources that together make up the entirety of the document, and is not limited to a single file such as an HTML file. For example, a web page corresponding to the URL "www.example.com" may include an HTML file "www.example.com/index.html" as well components such as a CSS file "www.example.com/main.css," an image file "www.example.com/image.jpg," a font file "www.example.com/font.woff," and other resources referenced in the HTML file or other components of the document. Embedded components of the web page, while often retrieved as separate files from separate URLs, are typically needed to fully render or display the web page, and are retrieved and processed automatically by a web browser as part of the process of loading the web page.

When a web browser loads a web page, the web browser gradually discovers the resources needed to render the web page. For example, when the web browser processes an HTML file, the web browser may determine that certain CSS files, font files, and other resources are also needed to render the web page. The web browser identifies and retrieves these additional resources, which may refer to yet more resources for the web browser to retrieve in order to complete the page.

As an example, a web page may include an HTML file that refers to a first CSS file, which refers to a second CSS file, which refers to a third CSS file. Typically, the web browser determines that the first CSS file is needed only after the HTML file for the web page is received and processed. Then, there is a delay as the web browser retrieves and processes the first CSS file. From the content of the first CSS file, the web browser determines that the second CSS file is needed, and there is another delay as the web browser retrieves and processes the second CSS file. From the content of the second CSS file, the web browser determines that the third CSS file is needed, and there is a third delay as the web browser retrieves and processes the third CSS file. This loading process involves sequentially loading and processing four different files, and each time another file is processed, reflow of the web page may change the layout provided for display to the user.

To avoid the delays associated with sequential resource discovery and loading, some of the information needed to render the web page may be provided as metadata early in the rendering process. For example, when a web browser requests the HTML file for a web page, the web browser can also request metadata for the web page from a metadata service that assists in speeding up page loading. The metadata service can provide the content of multiple CSS files, even before the web browser determines that the CSS files are needed. As a result, when the web browser processes an HTML file, the web browser can take advantage of the information in the metadata to provide accurate layout and formatting with the initial view of the web page provided to the user.

In some implementations, a device requests a resource of a document from a first source. The device requests metadata for the document from a second source that is different from the first source. The device receives the requested metadata for the document from the second source, and receives the requested resource of document from the first source. The device provides, for display, a first representation of the document based on the metadata received from the second source. After providing the first representation of the document, the device generates a second representation of the document that combines portions of the first representation with additional portions of the document and provides the second representation for display.

In the example of FIG. 1, in stage (A), the user navigates to a web page using a web browser of the client device 110. For example, the user may enter a URL for the web page or interact with a link to the web page.

In stage (B), the web browser of the client device 110 sends a request 112 for the content of the web page (e.g., one or more of the actual resources of the document). The web browser sends the request 112 to the computing system 120, which is a server hosting the web page. The computing system 120 may be operated by the content provider that creates or distributes the web page, or by a content delivery network or other entity that provides the web page on behalf of the content provider. The request 112 may be, for example, an HTTP "get" request for retrieving the resource corresponding to the URL of the web page (e.g., the main HTML file for the web page).

In stage (C), the web browser of the client device 110 sends a request for data for speeding up loading of the web page. The request 114 is separate from the request 112 and may be sent to a server, domain, or system different from the one than provides the web page. For example, the web browser can request metadata from a metadata service provided by the computing system 130, which may be provided by a third party independent of the content provider and computing system 120. The request 114 identifies the web page that the client device 110 is loading, which allows the metadata service to provide metadata specific to the web page being loaded. For example, the request 114 may indicate the URL for the web page.

The web browser can send the request 114 for metadata before receiving the HTML file or any other resources of the web page. The metadata service can provide metadata based on identification of the web page alone, for example, without identification of the specific resources referenced within the HTML file or within other components of the web page. As a result, the requests 112, 114 can be issued in parallel, at approximately the same time. In some implementations, the web browser is configured to send a request for metadata each time a new document is loaded to automatically enhance the loading process. For example, each time a new document is loaded, the web browser may send a request to a metadata service at a known location, e.g., "www.example.com/metadata_service," and request metadata for the page.

The computing system 130, upon receiving the request 114, determines whether metadata is available for the web page identified in the request 114. The computing system 130 can have access to data storage 135 that includes metadata for each of many different web pages. As discussed further with respect to FIGS. 6 and 7, metadata for a web page can be selected ahead of time based on analysis of a rendering of the web page. The selected metadata for each analyzed page can be stored and later provided to devices to speed up loading. The computing system 130 can look up the URL of the web page in the stored data and provide any metadata that has been designated for speeding up loading of that web page.

In stage (D), the client device 110 receives the metadata 132 for the web page from the computing system 130. The received data for speeding up loading of the web page is referred to generally as metadata, since the received data can include information about the manner in which the web page should be displayed, such as sizes, positions, and styles of elements of the web page. As discussed further below, the metadata 132 can include a copy of data from resources of the web page. The metadata 132 may additionally or alternatively include other data generated through analysis of the web page.

In stage (E), the client device 110 receives one or more resources of the web page, such as an HTML file 122, from the computing system 120. Since the requests 112, 114 are issued at approximately the same time, the metadata 132 and the HTML file 122 are received at approximately the same time. When the web browser processes the HTML file 122, information about the layout of the web page and information from embedded components is already present in the metadata 132. In this manner, information from embedded components (e.g., CSS files, script files, fonts, etc.) can be present at the client device 110 even before the web browser discovers references to those components and determines that the information is needed.

The received metadata 132 may include any of a variety of types of information that can speed up presentation of the web page to the user 102. In some implementations, the metadata 132 indicates layout or formatting of the web page. The metadata 132 may include information about a previous rendering of the web page. In some implementations, the metadata 132 includes information about the nodes in a DOM tree for the web page and styles corresponding to the nodes. In some implementations, the metadata 132 describes characteristics of the document design or page structure of the web page. In some implementations, the metadata 132 includes non-displayable content from the web page, and excludes the displayable content of the web page. For example, in some implementations, the metadata 132 may include any data from the resources of the web page other than images and text designated for display to a user.

In some implementations, the metadata 132 includes data from embedded components (e.g., a portion of or all of one or more components) of the web page. For example, as discussed further below, the metadata 132 may include a copy of the data in one or more CSS files, or specific portions of CSS files, of the web page. In some implementations, the metadata 132 indicates a list of components to be downloaded, without including the data from those components. For example, the metadata may identify the CSS resources needed to render the web page, to speed up the identification and retrieval of needed components. In some implementations, the metadata 132 includes data from some components of the web page, and only identifies other components.

Some of the metadata 132 may indicate the layout or formatting of a completed rendering of the web page. For example, the metadata 132 may indicate positions and sizes of images and other elements displayed in a view of the web page. The metadata 132 may indicate final sizes and positions of elements determined from a previous full rendering of the web page by another device (e.g., a device other than the client device 110). For example, the sizes and positions indicated can be sizes and positions of elements as they occur after JavaScript code or other scripts in the web page have been executed. As a result, the effect of scripts that adjust the layout of the web page is already reflected in the metadata 132.

In conventional loading processes, when a web browser first generates a layout for a web page, the web browser typically does not know the final layout of the page. For example, the web browser may not be able to accurately determine the final size of an image in the web page. The browser may estimate the size of an image at first, but may have to change the size or position of the image as additional resources are discovered and processed. However, by providing the final sizes of images and other elements in metadata 132, the web browser's initial rendering can accurately place and size the image as it appears in the final rendering, and reflow can be avoided.

The metadata 132 may include script files or portions of scripts embedded in the web page. In addition, or as an alternative, the metadata may include information about the effects of scripts on the layout of the page, so that the appropriate features of the layout can be included before actually downloading and executing the scripts.

The metadata 132 may include style data from CSS files embedded in the web page. In some implementations, the metadata 132 includes the entire set of data in CSS files referenced by the web page. Multiple CSS files may be combined or in-lined to improve efficiency. In some implementations, the metadata 132 includes only selected portions of the CSS files in the document, and omits portions of the CSS files that are not actually needed to render the web page. For example, various CSS files referenced by the web page may total 50 kilobytes of data. Only 20 kilobytes of the data may actually be needed to fully render the web page. For example, style information relating to a particular type of element may be omitted if there are no elements of that type in the web page. The metadata 132 may include a proper subset of the CSS data, such as only the 20 kilobytes needed, to limit the amount of data transferred.

The metadata 132 may include custom fonts used in the web page. Rather than including fonts, the metadata 132 may include a list of font files that are used and URLs for those fonts, to allow the web browser to retrieve the fonts before the web browser would typically determine that the fonts were needed.

In some implementations, the metadata 132 indicates the location of the "fold" of the web page. The location of the fold can represent the visible portion of a page for a given screen size. Typically, the fold refers to an edge or boundary of a display area in which a resource is displayed, such as the bottom edge of the display area for the web page. When a document is displayed in a web browser, the document typically extends beyond the initial viewing area of a web browser, and the user must typically scroll or otherwise navigate within the document to reveal content not initially presented in the display area. The portion of a document that is initially viewable within the browser on the user's display is referred to as the above-the-fold region of the document. For example, the above-the-fold region can be the portion of a document shown in a display area after the resource is rendered and displayed, before the user scrolls to reveal additional content. The remainder of the resource, which typically may be revealed by scrolling downward within the browser, is referred to as a below-the-fold region of the document.

In some implementations, the metadata 132 indicates which images are visible for a given screen size. The metadata 132 may indicate multiple different sets of images visible at different sizes of screens or display areas. The web browser may use information about the fold of the web page and the images visible to prioritize processing of portions of the web page. For example, portions of the web page that are visible in the above-the-fold region may be processed before other portions of the web page that will not become visible until the user reveals them by scrolling.

The metadata 132 may exclude the viewable content of the web page. For example, text, images, and other visible elements in the web page are excluded from the metadata 132, and are not provided by the computing system 130. For example, without including the actual text to be shown to the user, the metadata 132 may indicate the font and style for the text and a location and size of an area in which to display text. Similarly, the metadata 132 can indicate sizes and locations of images in the layout of the page, and not include the images themselves.

In some implementations, the metadata 132 may include viewable content of the web page. For example, the metadata 132 may include images from the web page. The metadata 132 may include actual images for the document, or may include lower resolution images or compressed images for use in an early view of the document. In some instances, fewer than all of the images that would be visible in the document are provided. For example, the subset of images provided may include images located at a central region of the document and/or images of at least a minimum size, and may exclude the other images of the document. In some implementations, the metadata includes images for display in the above-the-fold region of the document (e.g., in the top portion or initial view of the document that is visible before scrolling by the user), and excludes images for display in the below-the-fold region of the document (e.g., the portion revealed by scrolling). Other criteria for selecting images to provide in metadata may be used. In some implementations, any portion of the web page may be provided to speed up loading of the page.

In stage (F), the web browser of the client device 110 provides a view of the web page using the metadata 132, as shown in user interface 150. The web browser is configured so that the layout engine of the web browser creates the view of the page according to the information in the metadata 132. The metadata 132 can allow the web browser to provide a view of the web page more quickly than through analysis of the web page alone. In addition, the initial view of the web page can include a more accurate layout than would be initially provided without the metadata.

The view that the web browser provides can include a portion of the content of the web page, formatted or arranged as indicated in the metadata 132. For example, the HTML file for the web page may include text for display to the user 102, and the text may be shown in a style defined by CSS in the metadata 132. As a result, the initial view can be more accurate rather than a view based on the HTML file alone, and the view can be provided in less time than is required for discovery and retrieval of the CSS resources referenced in the web page. The text may also be displayed using font data included in the metadata 132. Similarly, images and other elements of the web page may be displayed at the sizes and positions indicated by the metadata 132.

In some implementations, the web browser may provide a view of the web page that is based on the metadata 132 before processing or before receiving the HTML file or other content of the web page. For example, if the metadata 132 is received much earlier than the HTML file for the web page, the web browser may generate an initial view based entirely on the metadata 132. The initial view may include, for example, images from the metadata 132, as well as headings or other portions of the web page from h metadata 132, formatted according to CSS information and/or layout information in the metadata.

If the content of an image or other element is not available when the web browser provides the initial view of the web page, the web browser may insert a placeholder or otherwise reserve the space that the element would occupy. After the element has been retrieved, the web browser may be inserted into the designated space that has been reserved. Because the final size and position of the element is known when the initial layout is generated, the element can be inserted into the web page at the correct size and position without displacing other content of the web page.

In some implementations, the metadata 132 instructs the web browser to defer invoking JavaScript or other scripts until after presenting the initial view of the web page using the information in the metadata 132. As a result, the view of the web page can be provided without delays for processing JavaScript or other scripts.

Typically, JavaScript content does not cause much visible content to be added to a view of a web page. In many instances, the majority of a web page can be shown without processing JavaScript content. In other instances, however, JavaScript or other invokable content may affect the content displayed to the user. For example, JavaScript code may adjust the position or size of an element displayed in the web page. As another example, when interpreted by the browser, JavaScript code may insert an element into the document object model (DOM) that the web browser constructs for the web page. The insertion of the element may cause other elements, such as elements located below the inserted element in the DOM tree, to change positions in the layout of the web page.

When the web browser defers processing of JavaScript content, the web browser can still lay out elements with accurate sizes and positions using the metadata 132. The metadata 132 can indicate characteristics of the final layout of the web page after all scripts and elements have been discovered and processed. By using the layout characteristics indicated in the metadata 132, which already take into account any changes caused by JavaScript or other invokable content, the web browser may generate an accurate layout before JavaScript content is processed. As a result, even when JavaScript content that affects page layout has not been processed, the web browser can provide a view with an accurate layout.

While the user interface 150 is displayed, the web browser continues the resource discovery process for loading the web page. Each component of the web page is identified, retrieved, and processed in turn, in the same manner that the resources would normally be processed if the metadata 132 were not available. These components may be requested and received from the computing system 120 or other system, from the same URLs specified within the web page. As new resources are discovered and retrieved, the web browser blends the newly retrieved content with the initial view of the web page. In the user interface 150, display areas 151*a*, 152*a* are set aside for elements for which the displayable content has not yet been received. At the time the user interface 150 is first displayed, the web browser may not yet have discovered the resources, or may be waiting for transfer of the resources to complete. Because the metadata 132 for the web page indicates the sizes and positions of these elements, the space is reserved in the layout so the elements may be inserted later without altering the layout of the web page.

In some implementations, resources that are included in the metadata 132 (e.g., resources for which data is already present at the client device 110) are also separately downloaded to the client device 110 during the resource discovery process after receiving the metadata 132. For example, even though the metadata 132 includes data in a CSS file of the web page, the web browser may continue to discover, retrieve, and process the original CSS file that is provided by the content publisher. By processing the original resources, as received directly from the publisher, the web browser may verify the correctness of the layout that has been generated. Differences between the original resources of the web page and the metadata 132 are resolved in favor of the original resources. For example, if a CSS file indicates that an aspect of the layout of the web page is different from what is indicated in the metadata 132, the web browser updates the view to reflect what is in the CSS file. Metadata of a web page typically changes infrequently. However, the actual resources of the web page will be most current, and in some instances, the metadata 132 may not include recent changes to the metadata. Completing the resource discovery process can verify correctness can ensure that any recent changes to the web page are ultimately incorporated in the view presented to the user 102.

In some implementations, portions of a document that are included in the metadata 132 are not separately downloaded during the resource discovery process. For example, when the metadata 132 includes resources of the web page or portions of the resources, the web browser may use the information in the metadata 132 without additionally downloading the resources from the server hosting the web page. As an example, the web browser may determine that the metadata 132 includes the portion of a CSS file that is needed to display a web page, and as a result, may determine not to download the CSS file from the URL indicated in an HTML file. The metadata 132 may indicate which resources or portions or resources are included in the metadata 132 to allow a web browser to determine which resources may not need to be separately downloaded.

As the client device 110 receives and processes additional resources of the web page, the client device 110 may provide updates to the view of the web page. The layout engine of the web page may make multiple incremental updates to the view while the resource discovery process is ongoing. These updates combine additional content of the web page with the view in the user interface 150. Each update can provide a more complete view of the web page. New content may be added, and some elements, such as placeholders in the user interface 150 may be replaced with the actual content of the web page. Through this series of updates, the user 102 can experience a seamless transition from the initial or preliminary view of the web page in the user interface 150 to a complete, final view of the web page. The use of metadata 132 allows the web browser to generate the correct, final layout for the web page for the initial view. As a result, merging or blending the additional content involves placing content in the initial layout, and the page loading process may be completed without reflow or alteration of the layout of the page.

In stage (G), the web browser of the client device 110 provides user interface 160, which is the final, completed view of the web page, after discovering and processing all of the components of the web page. Elements that were not available when the user interface 150 was provided have been inserted into the view. For example, the display areas 151a, 152a which were reserved for elements not yet available have been replaced with the actual content 151b, 152b (e.g., displayable text, images, or other content) of the page. JavaScript, as well as other scripts or instructions in the document, has also been invoked. In the initial view of the web page, some user interaction handlers, such as click handling routines, may not be active when invocation of JavaScript or other code is deferred. However, as the resource discovery process proceeds, JavaScript is processed and interaction handlers and other functional aspects of the web page are added.

In general, use of the metadata 132 to speed up loading of the web page does not require any alteration of the actual resources that make up the web page. Unlike document compression of document rewriting, the example of FIG. 1 involves transmission of the original, unmodified content of the web page to the client device 110 in its entirety. The metadata 132 is provided as supplemental information, in addition to the unaltered content of the web page provided by the content publisher. The metadata 132 may be relied on only to provide an early view of the web page until the web browser has time to retrieve and process the web page, including the original metadata provided by the web page's origin server. When the discovery process is complete, the view of the web page provided to the user may be based entirely on the original resources of the web page provided by the content publisher.

In addition, in the example of FIG. 1, the original content of the web page is received from the origin server for the web page, the computing system 120, and the flow of data is not re-routed or passed through a third party system such as a proxy server or content delivery network. The flow of data of the web page between the client device 110 and the origin server remains intact, and the metadata 132 is provided through a separate channel, independent of the transfer of the original content of the web page. As a result, the web page may be transferred from the content publisher to the client device 110 over a secure connection, for example, using Hypertext Transfer Protocol Secure (HTTPS) connection, and still benefit from faster loading using these techniques.

Metadata for speeding up document loading can be generated and provided by a third party, without requiring any inclusion of any custom features in the document or any modification of the document. Web pages do not need to be modified or adapted to take advantage of the technique of FIG. 1. As a result, enabling acceleration can be done easily by configuring a third-party service to provide metadata, without imposing any restrictions on content publishers. As discussed further with respect to FIG. 8, to permit a particular web page to be loaded faster, a computing system may retrieve the web page, analyze the page and generate appropriate metadata, and store the metadata in the data storage 135 so that the metadata can be provided to other devices.

Figure 2:
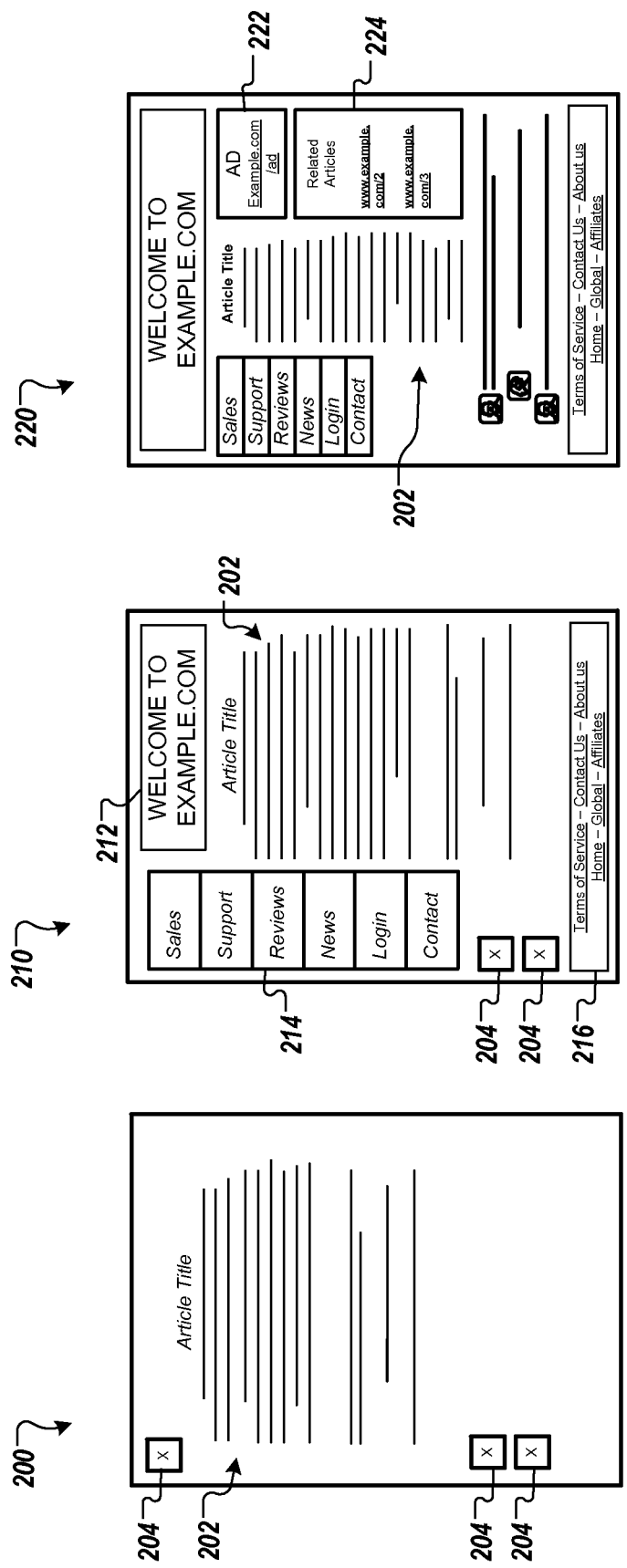
FIGS. 2A-2C are diagrams that illustrate examples of user interfaces shown while a document is loaded.

FIGS. 2A-2C are diagrams that illustrate examples of user interfaces 200, 210, 220 shown while a document is loaded. The example illustrates views of the document provided to a user while a web browser loads the document over a network without the benefit of any metadata to speed up the page loading. As a result, the web browser relies on the typical resource discovery process exclusively.

In FIG. 2A, the web browser provides the user interface 200 as an initial view of the document. A portion of the content of the document is shown, for example, including text 202 in an HTML file of the document. However, the web browser has not discovered and processed all of the CSS resources of the document, and so the text is not formatted according to the style defined for the text. The web browser has identified elements of the web page that must still be retrieved and added to the view, as shown by placeholders 204. The content of the document received and processed so far does not indicate the sizes and positions these elements should be displayed in the document. The web browser generates the layout by estimating the sizes and positions of the elements with the limited information available.

In FIG. 2B, the web browser provides the user interface 210 after discovering and processing additional components of the document. The user interface 210 is a more complete view of the document, but still includes only a portion of the document. A header element 212, a sidebar 214, and a footer 216 have been added. These additions required reflow of the page, e.g., a repositioning of elements in the page to accommodate the changes in layout. The region in which the text 202 is display has changed in size and shape and has moved within the document. The change in layout may be disconcerting to a user, since a user reading the text 202 in the user interface 200 would likely lose his place when the interface changes.

In FIG. 2C, the web browser provides the user interface 220 as a final view of the document after completing the resource discovery process. Changes to the layout and processing of scripts have again caused reflow of the page as the elements previously displayed have been moved and resized. The display area for the text 202 has also changed again. In addition, after processing the CSS content of the document, the text style (e.g., font size, color, emphasis, font and/or other formatting) for the text 202 has changed. The changes to the layout and formatting of the document during loading may seem abrupt or distracting, and the re-arranging of elements may limit the usefulness of the document to the user until the final, complete view of the document (e.g., user interface 220) is provided.

Figure 3:
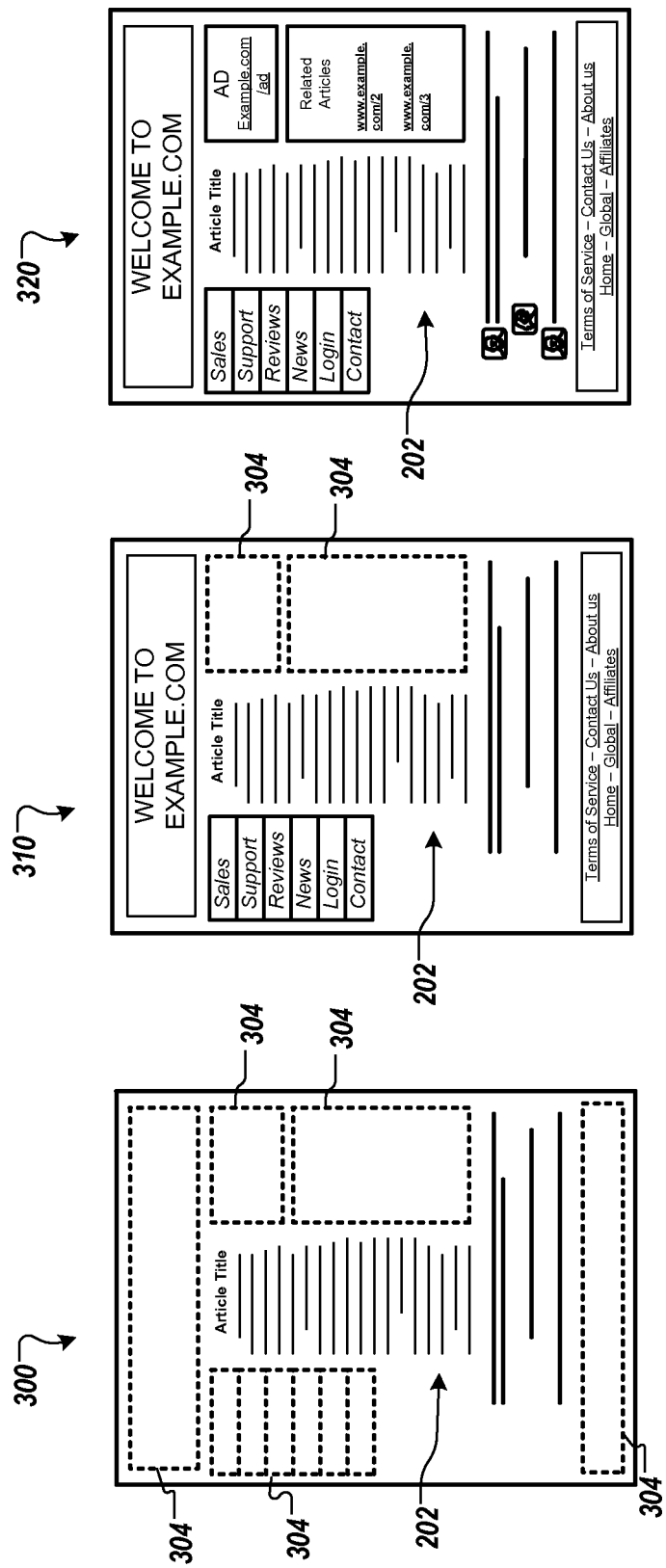
FIGS. 3A-3C are diagrams that illustrate examples of user interfaces shown while a document is loaded.

FIGS. 3A-3C are diagrams that illustrate examples of user interfaces 300, 310, 320 shown while a document is loaded. The example illustrates views of the same document shown in FIGS. 2A-2C, but as a web browser loads the document using metadata provided to speed up page loading.

In FIG. 3A, the web browser provides the user interface 300 as an initial view of the document. The web browser has received at least some of the content of the document (e.g., an HTML file) from the origin server for the document. The web browser has also separately received metadata for the document provided by another source (e.g., from a third party.) The layout and formatting of the document content is determined based on the metadata provided separate from the resource discovery process that is ongoing to retrieve and process the document from the origin server. The metadata can include data extracted from the document, such as CSS files or portions of the CSS files needed to render the document. In addition, or as an alternative, the metadata can include information about the final layout of the page, determined from analysis of a prior rendering of the document.

The layout and formatting information in the metadata is used to position and format content of the document, such as the text 202 that an HTML file indicates should be displayed to the user. The metadata indicates the sizes and shapes of the elements in the document. Elements that have already been retrieved, such as the text 202 that an HTML file of the document indicates should be displayed, are placed in the display areas indicated by the metadata. The metadata also indicates where other elements are placed in the final layout of the document, even though the elements have not yet been discovered in the resource discovery process. Space for these other elements is reserved in the layout, indicated by the display areas 304 shown in dotted lines. In some implementations, the reserved display areas 304 may include blank space (e.g., showing a background color or background image of the document). In some implementations, a placeholder element may be included to indicate to the user that content will be loaded in that region, or indicate the type of content to be loaded.

In FIG. 3B, the web browser provides the user interface 310 after discovering and processing additional resources of the document. The web browser has blended additional content discovered, such as image files and other components, with the initial view in the user interface 300. Additional elements have been added to the document, in place of the reserved display areas 304 that were set aside for those elements in the layout. Even though the web browser has discovered and added new content, the layout of the document has not changed. Reflow did not occur, and the text 202 is displayed in the same region of the document as in the user interface 300, and with the same font and style. A user that was reading the text 202 in the user interface 300 would be able to continue reading without interruption while the screen is updated to show the user interface 310. In some implementations, multiple intermediate views of a document may be provided as additional content of the document is blended with the initial view or subsequent views.

In FIG. 3C, the web browser provides the user interface 320 as a final or complete view of the document after completing the resource discovery process. All of the reserved display areas 304 have been filed with their respective elements. The elements displayed in the previous views (e.g., user interfaces 300, 310) are shown in the same sizes and positions as before. Because the metadata allowed the web browser to generate an accurate layout in the initial view of the page, updates to the page did not require changes to the layout, and reflow was avoided. Although the initial view was not complete (e.g., because some displayable elements were not present), use of the information in the supplemental metadata allowed the elements that were displayed were displayed correctly.

The user interface 320 may also incorporate various non-visible changes to the document. For example, processing of JavaScript may be deferred to allow the user interfaces 300, 310 to be provided with minimal delay. User interaction handlers or other functionality may not have been active when the user interfaces 300, 310 were provided. By the time the user interface 320 is provided, the JavaScript in the document has been processed. As a result, user interaction handlers or other functionality may be active in the document when the user interface 320 is provided. Even if the JavaScript content describes aspects of the layout or formatting, no changes to the layout are needed in some implementations because the supplemental metadata used to generate the initial view (e.g., the user interface 300) already indicated characteristics of the final layout after processing of the JavaScript content.

The user interface 320 is identical to the user interface 220, since all of the same content of the document (e.g., the original CSS files, JavaScript files, etc. provided by the content publisher) is retrieved from the same URLs and processed by the web browser in both examples. However, in FIGS. 3A-3C, the metadata allows more accurate layout and formatting for initial and intermediate views of the document, so the layout and formatting can remain consistent while the remainder of the document is gradually added.

Figure 4:
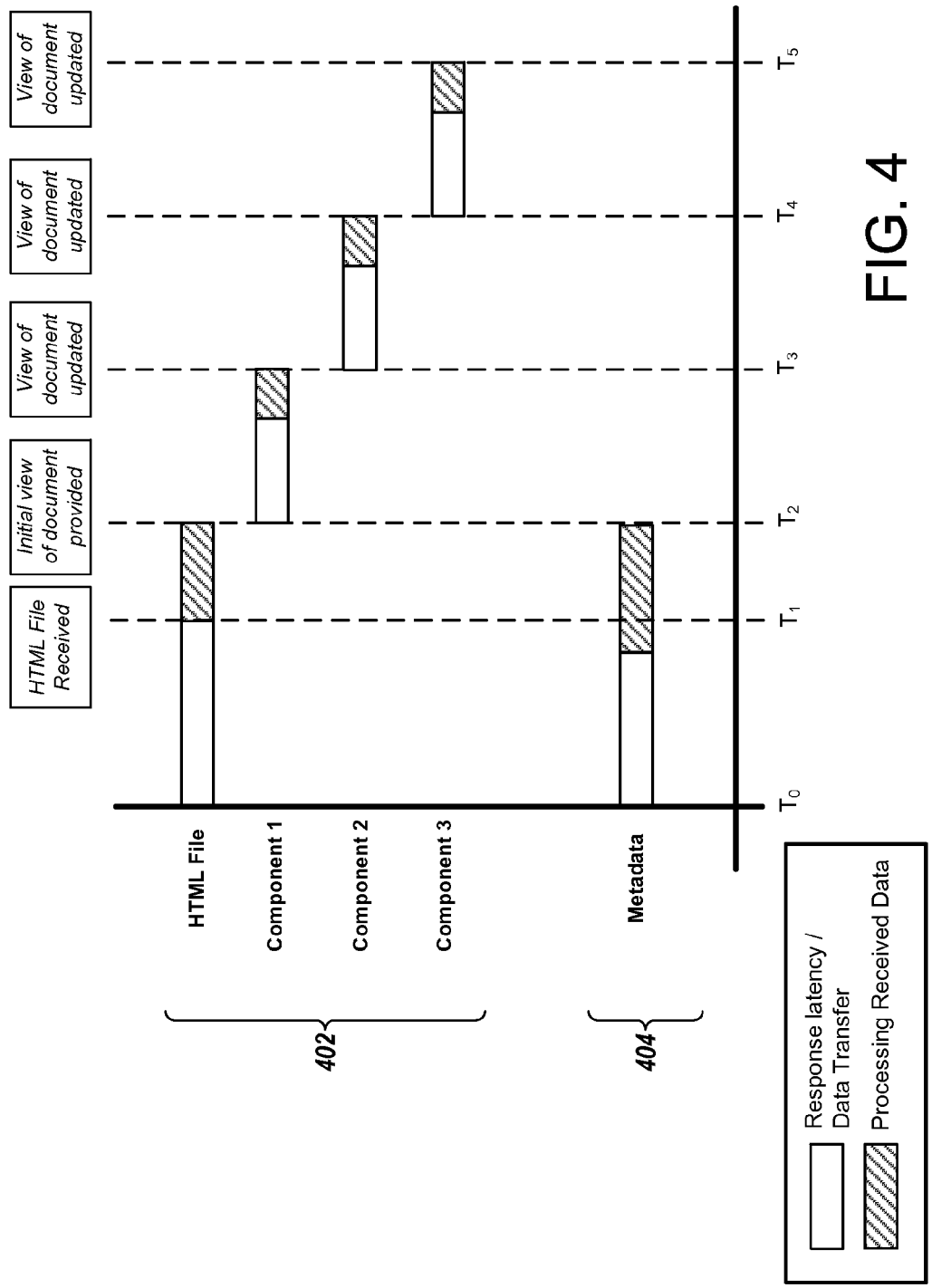
FIG. 4 is a diagram that illustrates an example of timing of events when loading a document.

FIG. 4 is a diagram that illustrates an example of timing of events when loading a document. In the example, a web browser retrieves and processes various resources of the document during a resource discovery process 402. The web browser also retrieves and processes additional metadata in acceleration process 404, to quickly provide views of the document that have an accurate layout. The document being loaded includes an HTML file and three other components, in separate resources, that are also needed to render the document. The components may be, for example, CSS files, JavaScript files, image files and other media files, font files, HTML files, or other types of resources. The HTML file refers to the first component, which refers to the second component, which refers to the third component, such that the three components are discovered sequentially.

At time $T_0$, the web browser makes a request for the HTML file, e.g., by initiating a request for the document from the document's URL. Before receiving the HTML file, the web browser makes a request to another server, such as a third-party metadata service, for metadata for speeding up loading of the document. The request for metadata may be made before, at approximately the same time as, or after the request for the document. The HTML file and metadata are transferred in parallel, and may be received at approximately the same time. In some instances, the metadata may be received before the HTML file because, for example, the metadata may include less data than the HTML file, and may be provided by a server system optimized for efficient delivery.

The web browser uses the HTML file and the metadata to generate an initial view of the document, which is provided at time $T_1$. Even without retrieving and processing the three other resources of the document, by using the metadata, the web browser can provide a view in which the portions of the document that are shown are displayed with correct layout and formatting. The metadata may include portions of one or more of the three components, allowing the web browser to use data from the components before the actual resources are retrieved in the resource discovery process 402. The metadata may also indicate sizes and positions of elements and other information about the document.

After an initial view is provided, the resource discovery process 402 continues. The web browser retrieves and processes each of the three additional components of the document, and completes processing these components at times $T_3$, $T_4$, and $T_5$, respectively. At each of times $T_3$, $T_4$, and $T_5$, the web browser provides an updated view of the document, blending additional content with the prior layout and view previously provided. Without the benefit of metadata, the layout of the document would not be finalized until time $T_5$, after the resource discovery process 402 is finished. However, by using the acceleration process 404 to retrieve metadata quickly, the final layout is actually generated much earlier, for example, for the initial view of the document.

Figure 5:
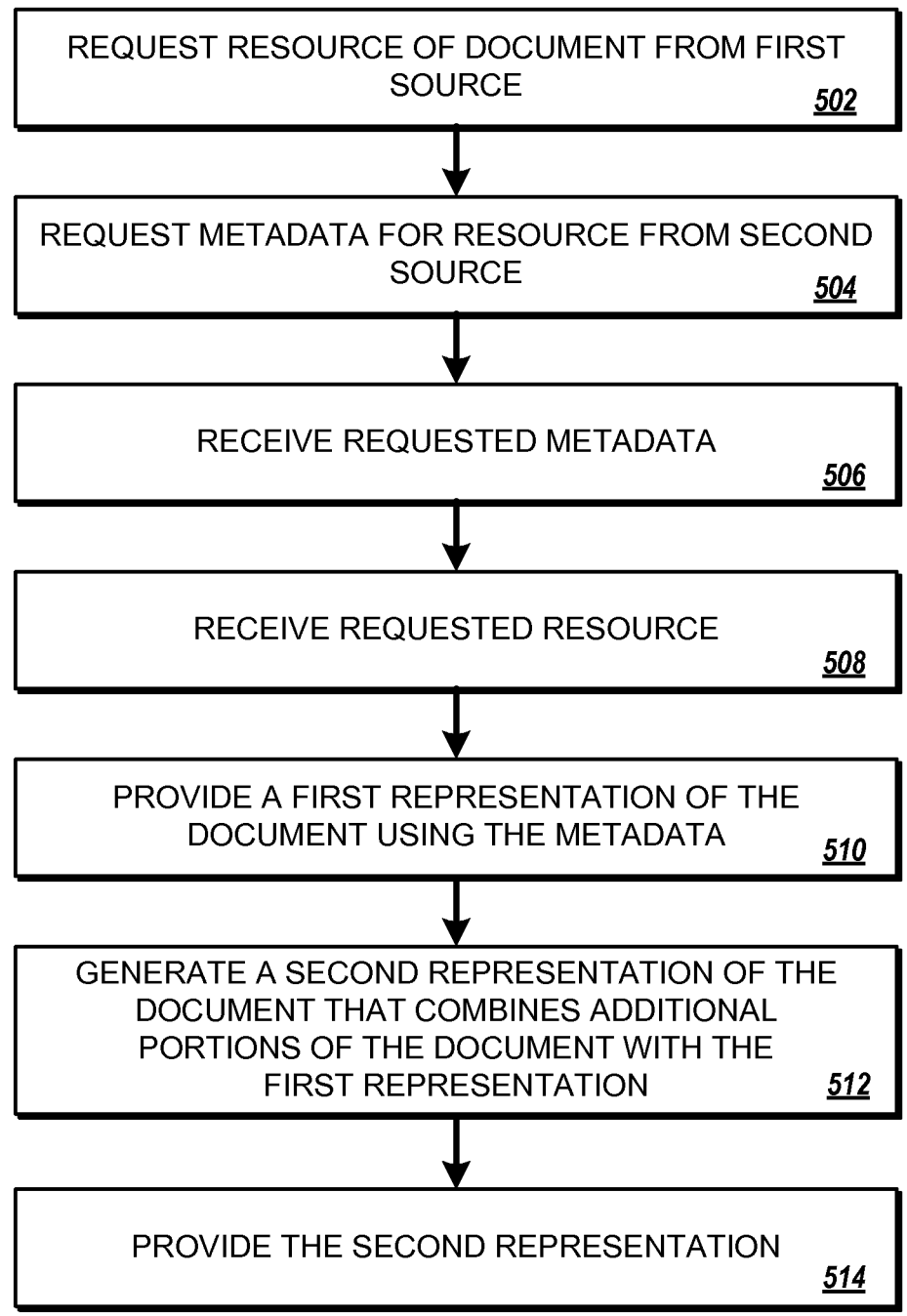
FIG. 5 is a flow diagram that illustrates an example of a process for speeding up document loading.

FIG. 5 is a flow diagram illustrating an example of a process 500 for speeding up document loading. The process 500 may be performed by the client device 110 of FIG. 1 or another device.

A device requests a resource of a document from a first source (502). For example, the device may send an HTTP GET request for the resource at a URL for the document (e.g., "GET http://example.com/HTTP/1.1 . . . "). The request may be sent in response to a user navigating to a web page, for example, by interacting with a link or other user interface element.

In a second request, the device requests metadata for the document from a second source that is different from the first source (504). The second request may be sent in response to the same interaction that triggered the first request. The device sends the second request before receiving the resource requested in action (502), so the resource of the document and the metadata may be transferred in parallel or in close succession. The request for metadata identifies the document being loaded, for example, by indicating the URL that is being fetched in action (502).

In some implementations, the metadata is requested from a third party independent of the publisher of the document. The metadata may be requested from a predetermined location or server that is configured to provide metadata of many different documents from many different Internet domains and content publishers. For example, the device may be configured to request metadata from a specific source, or one of a predetermined set of sources, each time a document is loaded.

The device receives the requested metadata for the document from the second source (506). The received metadata may include a copy of data from resources of the document (e.g., CSS files, font files, etc.), even though the device has not identified or specifically requested the resources. This may allow the device to receive content of various resources in the document before identifying and retrieving the specific resources that make up the document.

The received metadata may include data from CSS files of the document. For example, the received metadata may include the entirety of one or more CSS files, or may include only a subset of the data in the CSS files that affects the rendering of the document. The received metadata may indicate layout and formatting information for the document, including, for example, sizes and positions of images and other elements of the document in a final rendering of the document. The received metadata may include the data of one or more font files, or may identify the URLs of the font files that are used in the document. The received metadata may identify URLs of images or other elements of the document, allowing the web browser to request these elements more quickly.

In some implementations, the received metadata may include images from the document. For example, the metadata may include actual images for the document, or may include lower resolution images or compressed images for use in an early view of the document. In some implementations, when image file data is transferred in metadata, only images that would be visible in the document are provided. In some instances, fewer than all of the images that would be visible in the document are provided. For example, the subset of images provided may include images located at a central region of the document and/or images of at least a minimum size, and may exclude the other images of the document. In some implementations, the metadata includes only images for display in the document in the above-the-fold region of the document (e.g., in the top portion or initial view of the document that is visible before scrolling by the user). Other criteria for selecting images to provide in metadata may be used.

The device receives the requested resource of the document from the first source (508). For example, the received resource may be the main HTML file for the document (e.g., "http://example.com/index.html" for document "http://example.com/").

The device provides, for display, a first representation of the document based on the received metadata from the second source (510). The first representation may be an initial view of the document provided to the user after the user initiates navigation to the document. The first representation may include content from one or more resources of the document formatted or laid out using the received metadata.

After providing the first representation of the document, the device generates a second representation of the document that combines portions of the first representation with additional portions of the document (512). The device provides the second representation for display (514). After providing the first representation, the device may continue to discover and process resources of the document. For example, the second representation may add content from additional resources of the document that were identified and/or received after the first representation was provided. New elements may be inserted into the first representation, for example, in place of placeholder elements or into spaces reserved for the elements. The second representation may be provided without reflow (e.g., resizing or re-arranging) elements shown in the first representation. When processing of JavaScript or other content is deferred, the device may process the content. For example, user interaction handlers may be added to the elements in the first representation.

The layout and formatting of the first representation may be maintained in the second representation, for example, because the received metadata indicated a correct layout for the document. The first representation, which may be based on only an initial HTML file and the metadata, may be seamlessly enhanced with incremental changes until the full document is shown.

Figure 6:
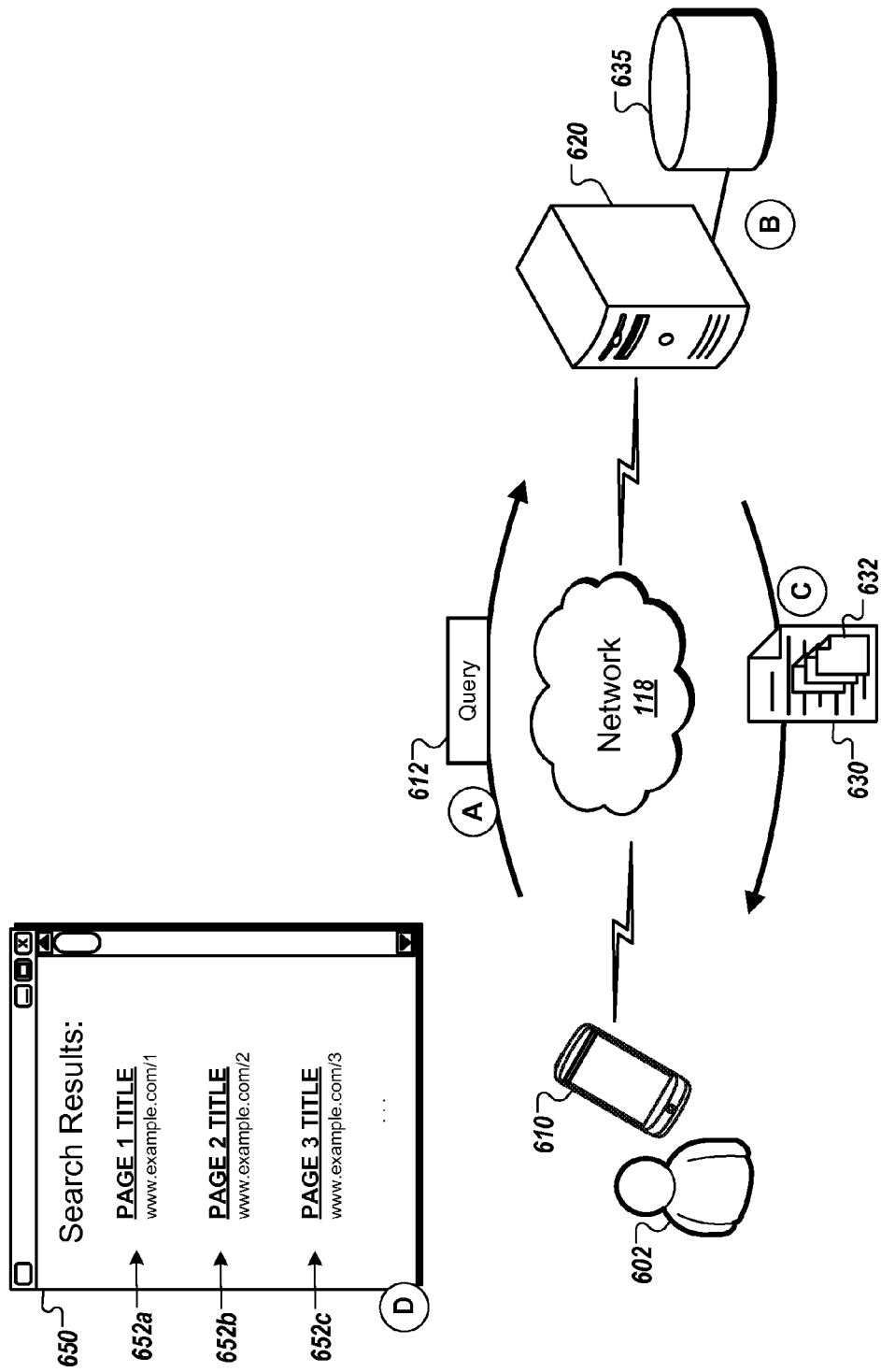
FIG. 6 is a block diagram that illustrates an example of a system for speeding up document loading.

FIG. 6 is a block diagram that illustrates an example of a system 600 for speeding up document loading. The system 600 includes a client device 610, a computing system 620 and a network 618. The figure shows stages (A) to (C) which illustrate a flow of data, and stage (D) which illustrates a user interface shown on the client device 610.

In the example of FIG. 6, metadata for speeding up loading of a document is provided before the user 602 of the client device 610 initiates navigation to the one or more documents. The client device 610 receives a referring document that includes a link to a destination document. Loading the referring document transfers metadata for speeding up loading of the destination document. When the user interacts with the link to the destination document, the metadata (e.g., information about layout and formatting of the destination document) is already present at the client device 610. As a result, the client device 610 may perform accelerated loading of the destination document without requesting metadata from a metadata service.

In stage (A), the client device 610 sends a query 612 to the computing system 620. In stage (B), the computing system 620 processes the query and generates a document to provide in response to the query. The computing system 620 may provide the query to a search engine and receive search results from the search engine, or otherwise obtain information responsive to the query. For example, the computing system 620 may obtain information that identifies a set of search result documents identified as relevant to the query. The computing system 620 generates a document, such as a search engine results page, that identifies search result documents.

The computing system 620 also accesses data storage 625 containing metadata for speeding up page loading. From the data storage 625, the computing system 620 identifies metadata for one or more of the search result documents, and includes the metadata in the search engine results page. In some implementations, the computing system 620 includes metadata for only the highest-ranking search result document, or for each of only a highest-ranking subset of the search result documents (e.g., the documents corresponding to the top three or top five search results). In some implementations, the computing system 620 includes metadata for each of the search results identified in the search engine results page, or for each of the identified search results for which metadata is available in the data storage 625.

The metadata 632 may include any of the types of data described herein for speeding up page loading, including, for example, data from CSS files of the search result documents, information indicating sizes and positions of elements in the search result documents, data from font files of the search result documents, data indicating resources needed to render the search result documents, and so on.

In stage (C), the computing system 620 provides a search engine results page 630 that includes metadata 632 for one or more search result document identified in the search engine results page 630. In some implementations, the metadata 632 is included in the same file as the search engine results page 630. For example, an HTML file for the search engine results page 630 can include the metadata including CSS content and layout information for one or more search result documents.

In some implementations, the metadata 632 may be provided in one or more files separate from the HTML file of the search engine results page 630. The files may be embedded as resources or components of the search engine results page that are indicated as needed to complete loading of the search engine results page 630. As a result, loading the search engine results page 630 at the client device 610 may cause the client device 610 to retrieve additional files containing the metadata 632 from the computing system 620 or another system. In this manner, the client device 610 may pre-cache the metadata for the search result documents as part of loading the search engine results page 630.

In stage (D), the client device 610 provides user interface 650, which includes a view of the search engine results page 630. The user interface 650 includes search results 652a-652c, which each include a link to a corresponding search result document as a landing page.

When the user 602 interacts with one of the search results 652a-652c, the client device 610 requests the corresponding search result document. The client device 610 also uses the metadata 632 for the corresponding search result, which was transferred to the client device 610 during loading of the search engine results page 630, to quickly generate a representation of the search result document with accurate formatting and layout. As the resource discovery process continues, the client device 610 updates the view of the search result document, blending the additional content of with the initial view generated using the metadata 632.

In some implementations, the computing system 620 generates the search engine results page 630 to include interaction handlers that cause metadata 632 to be requested in response to interacting with one of the search results 652a-652c. For example, instead of automatically downloading the metadata 632 as part of loading the search engine results page 630, user interaction with a link to a search result document may trigger both a first request for the search result document and a second request for the appropriate metadata 632.

Figure 7:
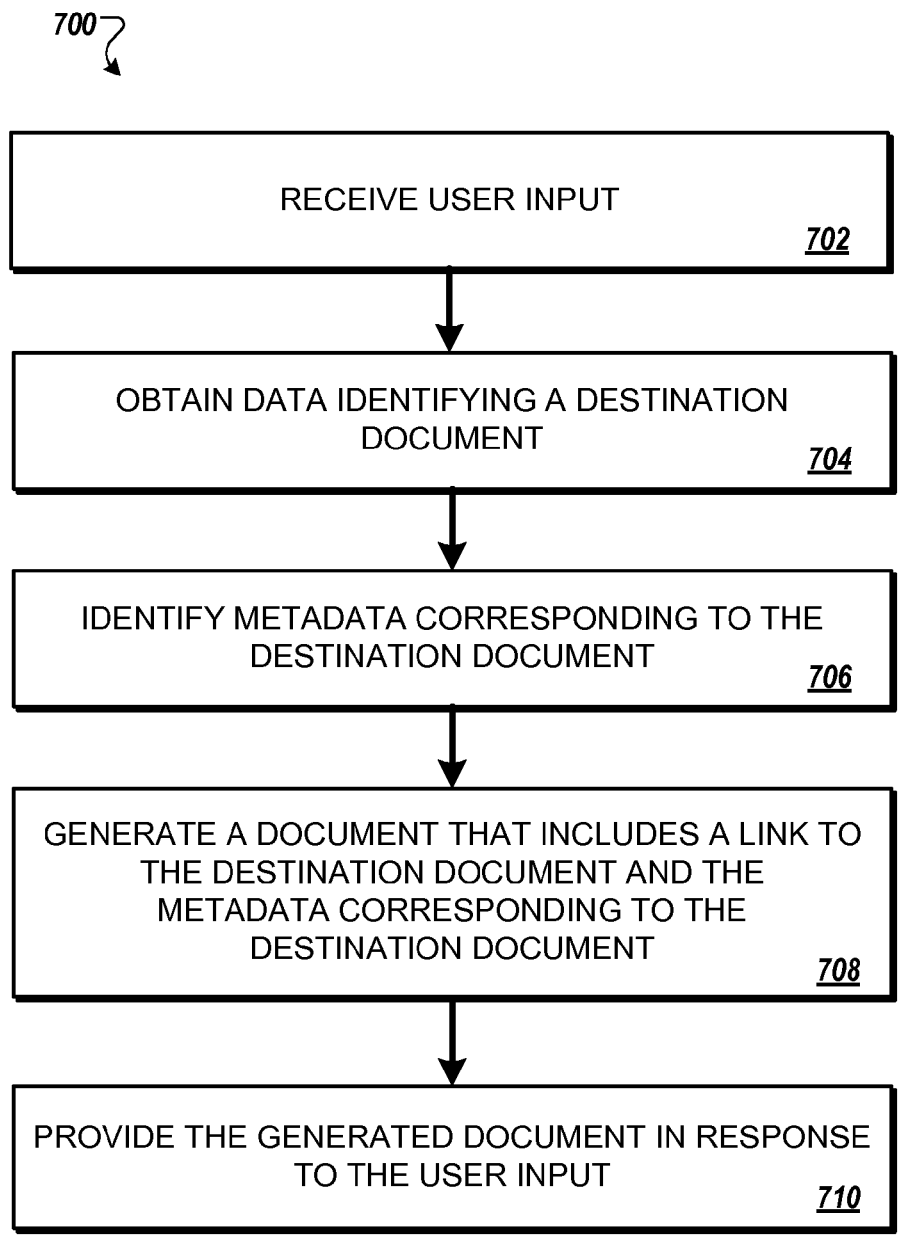
FIGS. 7 and 8 are flow diagrams that illustrate examples of processes for speeding up document loading.

FIG. 7 is a flow diagram that illustrates an example of a process for speeding up document loading. The process 700 may be performed by the computing system 620 of FIG. 7 or another computing system.

The computing system 620 receives user input (702). For example, the computing system 620 may receive a search query submitted by a user.

The computing system 620 obtains data responsive to the user input (704). The data identifies a destination document to be referenced in a response to the user input. For example, the computing system receives search results that each indicate a search result document relevant to the search query.

The computing system 620 identifies metadata for speeding up loading of the destination document (706). For example, the computing system 620 can access data storage to identify previously selected data about the layout and formatting of the destination document. Metadata designated as corresponding to the URL of the destination document. In some implementations, metadata for multiple destination documents, such as multiple search result documents is included.

The computing system 620 generates a document that includes a link to the destination document and also includes the metadata for the destination document (708). In some implementations, the metadata may be part of the generated document (e.g., in an HTML file). In some implementations, loading the generated document at a client device causes the client device to retrieve the metadata for the destination document. As an example the computing system 620 may generate a search engine results page having links to search result documents. The resources that comprise the search engine results page can include the metadata for one or more of the search result documents. Alternatively, the search engine results page may include scripts or other instructions that cause the client device to request and receive the metadata for one or more result documents.

The computing system 620 provides the generated document in response to the user input (710). Transferring or processing the generated document can transfer the metadata for the destination document. After loading the generated document, when a client device navigates to the destination document, metadata for speeding up loading of the destination document is already present at the client device.

Figure 8:
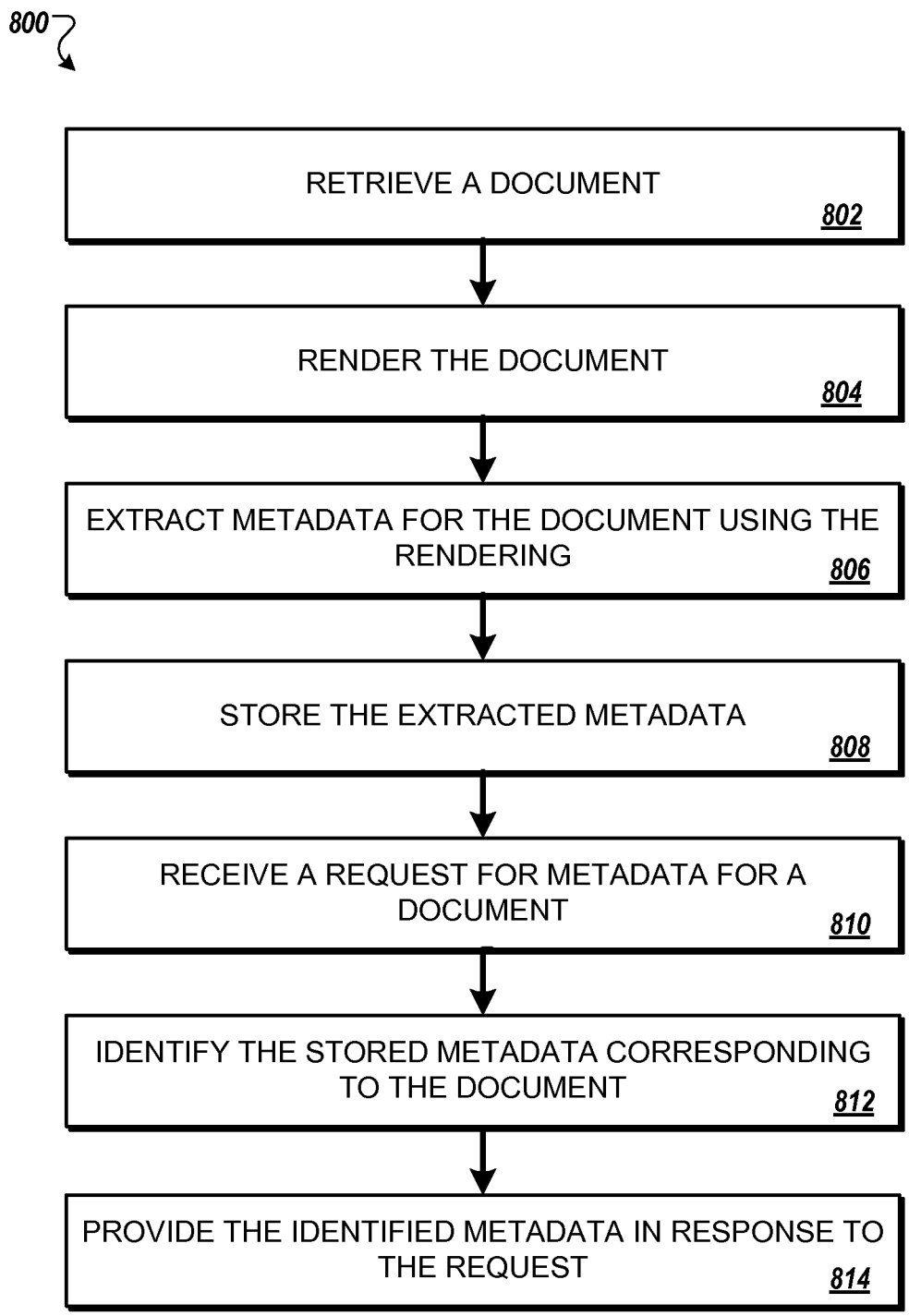

FIG. 8 is a flow diagram that illustrates an example of a process for speeding up document loading. The example of FIG. 8 describes techniques for generating metadata for documents, and then providing the metadata in response to requests for metadata.

A computing system retrieves a document (802). For example, web pages can be crawled so that the data of the web pages is obtained. Documents can be obtained as part of crawling for indexing or other purposes. The computing system may receive all the resources that are components of a document or affect the display of the document.

The computing system renders the document (804). For example, the document can be rendered with a layout engine a web browser (e.g., a web browser engine or rendering engine), such as WebKit or Gecko. When rendering the document, the layout engine obtains and processes all resources of the document, including CSS files, JavaScript files, font files, and all other resources that affect the display of the document. The computing system can produce the same rendering result that a client device would produce by discovering and producing all the embedded resources in the document. The computing device may generate the rendering using a "headless" mode, without any visual display of the rendered content. In some implementations, the layout engine produces a render tree and a document object model (DOM) tree.

The computing system extracts metadata for the document using the rendering of the document (806). The computing system analyzes the rendering, for example, inspecting the DOM tree, the render tree, and the final layout for the document. The metadata extracted may include various characteristics of the layout and formatting of the page. The computing system may apply a set of predetermined rules to determine, for example, which elements are visible in the rendering and the sizes and positions of the elements. Because a final, complete rendering is analyzed, the layout characteristics already reflect any layout features added or adjusted by processing of JavaScript or other instructions in the page.

The computing system can also walk through the DOM tree and render tree to identify which resources of the document are actually used to affect the display of the document. In addition, the computing system can determine which portions within a particular resource affect the display of the document. For example, the computing system can determine that a particular CSS file provides styles for the document, but only a subset of the styles defined are actually used in the document. The computing system includes in the metadata the CSS data that actually affects the display of the document, and omits CSS data that does not affect the display of the document. Data from multiple different resources of the document (e.g., multiple CSS files, font files, etc.) can be included in the metadata that is extracted. The metadata may additionally or alternatively indicate characteristics of the DOM tree the render tree.

In addition, or as an alternative, the metadata may be generated based on data from other users that have previously rendered the document. For example, characteristics of renderings on one or more user devices, rather than a server system, may be used to select metadata. Prior renderings may indicate, for example, where the fold of the page is located on a certain device or class of devices, which images are displayed above the fold, the size and position of images and other elements, which CSS data is needed to render the document, or other information about the document.

The extracted metadata generally excludes the visual elements of the document. For example, the title and body text may be excluded, but the CSS data that defines the styles for the text may be included. Similarly, the actual images of the document may be excluded, but information indicating the size and position of the images in the layout may be included.

The displayable elements in documents change frequently, but the overall design of a document changes much less frequently. As a result, metadata that describes the formatting and layout of the document may remain valid for a much longer time than displayable elements. For example, a web page may include a body region including text that is frequently updated. However, the text style and the size and position of the body region may be consistent for days, weeks, or months. Similarly, a web page may include an image, and although the particular image included may change from time, the web page may consistently include an image with the same position and/or size (e.g., in the top right corner, at 300 pixels by 300 pixels).

Omitting displayable content may have other advantages also. For example, if the document changes and the metadata used to generate an initial view of the document, inaccuracy in layout and formatting may be less distracting than, for example, providing an out-of-date image or text. Similarly, the layout and formatting of a document are typically not sensitive, and could be provided for secure content.

The computing system stores the extracted metadata for the document (808). For example, the computing system can associate the metadata with the URL of the document or another identifier for the document. Then, when a request for metadata is received that identifies the particular document, the metadata specific to the identified document can be provided.

Metadata can be generated by a third party, without changes to documents by the authors of the documents. As a result, a service for providing metadata can be scaled to provide metadata for a large number of documents. No changes to the manner of delivery of the document or the resources of the document are needed to allow metadata to be provided for speeding up page loading.

The actions (802) to (808) can be repeated for each of multiple documents, including documents from many publishers or Internet domains. For example, a system may store metadata for multiple documents to be able to provide a metadata for any of the multiple documents.

After metadata for the document has been stored, the computing system receives a request for metadata of the document (810). For example, the computing system receives a request that identifies a URL of the document.

In response to the request, the computing system identifies the stored metadata corresponding to the document (812). For example, the computing system accesses the metadata designated as corresponding to the URL.

The computing system provides the metadata corresponding to the document in response to the request (814). By providing the metadata, the computing system may include the portions of resources, such as CSS files, that are needed to generate a correct layout of the document, before the device requesting the metadata identifies the particular resources that are part of the document.

In some implementations, the actions (802) to (808) are performed as a separate process, for example, as a pre-processing phase to generate a collection of metadata for one or more documents. Similarly, actions (810) to (814) may be performed as a separate process, for example, to provide a metadata service after a library of metadata is generated, or is provided by another system.

In some implementations, a web browser may be configured to request metadata from the origin server for a document, rather than from a third-party metadata service. For example, the HTML file for a document and a request for metadata to speed up loading could be requested from the same server. Authors of documents could individually identify the metadata of their pages that would assist devices to more quickly generate initial views of the documents, and could provide the metadata before the individual resources containing the metadata are requested.

The techniques described above allow metadata to be extracted for public documents provided through secured protocols such as HTTPS. Metadata may be provided by a third party and used to speed up page loading even when the resources of the document are transferred over HTTPS the origin server. The actual resources of the document do not flow through the third party server, since the metadata is provided separately as an additional aid in the loading process.

In some implementations, a computing system can receive information regarding a rendering of a document from a client device. In instances where the computing system is not able to access a document, information about the document provided by client devices may be used to identify metadata from the document for speeding up page loading. For example, after rendering a document, a web browser can provide information about, for example, the sizes and positions of elements in the page. The web browser may indicate the formatting and styles used, and may provide information derived from the DOM tree or render tree for the document. In general, the web browser may indicate general properties of the layout of the document while omitting personalized content and other information displayed in the document. Submissions from many web browsers of many different may allow the computing system to collect information about renderings of various pages that the computing system is not able to retrieve. In some implementations, users may be provided the option whether their devices provide information to the server, and layout and other document properties may be sent only when a user has opted in to allow submission of document information.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method performed by data processing apparatus, the method comprising:
   requesting, by a client device and over a network, a resource of a document from a first source;
   before receiving the requested resource, requesting, by the client device and over the network, metadata for the document from a second source that is different from the first source;
   receiving, by the client device, the requested metadata for the document from the second source, wherein the received metadata comprises data indicating characteristics of layout or formatting of the document;
   receiving, by the client device, the requested resource of the document from the first source;
   providing, for display and by the client device, a first representation of the document based on the received metadata from the second source; and
   after providing, for display, the first representation of the document based on the metadata from the second source:
      generating, by the client device, a second representation that combines portions of the first representation with additional portions of the document; and
      providing, for display and by the client device, the second representation that combines portions of the first representation with the additional portions of the document.

2. The method of claim 1, wherein requesting metadata for the document from the second source that is different from the first source comprises requesting metadata for the document from a second source that is not identified by resources of the document.

3. The method of claim 1, wherein providing, for display, the first representation of the document based on the received metadata from the second source comprises:
   providing a first representation of the document that includes a displayable element indicated from the received resource of the document at a position and size indicated by the metadata received from the second source.

4. The method of claim 1, wherein providing, for display, the first representation of the document based on the received metadata from the second source comprises:
   determining, based on the received metadata, a region for display of an element of the document, before receiving resources of the document that indicate the region for display of the element; and
   providing the first representation of the document that reserves a region of the representation for the element.

5. The method of claim 1, wherein generating the second representation that combines portions of the first representation with the additional portions of the document comprises:
   generating a second representation that adds an additional displayable element of the document in a position and size indicated by the received metadata from the second source.

6. The method of claim 1, wherein receiving the requested metadata for the document from the second source comprises receiving metadata that includes style data from a cascading style sheet resource, wherein the style data includes data in the cascading style sheet resource for one or more styles that are used in the document, and the style data excludes data in the cascading style sheet resource for one or more styles that are not used in the document.

7. The method of claim 1, wherein receiving the requested metadata for the document from the second source comprises receiving data from a font resource of the document.

8. The method of claim 1, wherein receiving the requested metadata for the document from the second source comprises receiving, at the client device, data derived from a prior rendering of the document, wherein the prior rendering was generated by a device that is different from the client device.

9. The method of claim 8, wherein receiving the data derived from the prior rendering of the document comprises receiving data indicating layout characteristics of the prior rendering or formatting characteristics of the prior rendering.

10. The method of claim 1, wherein the document includes script content that, when processed, affects the layout of one or more elements of the document, and
   wherein receiving the requested metadata for the document from the second source comprises receiving data indicating a layout of the one or more elements that reflects the effects of processing the script content.

11. The method of claim 1, wherein receiving the requested metadata for the document from the second source comprises receiving data indicating a location of a fold of the document; and
   wherein the method further comprises:
      based on the data indicating the location of the fold of the document, identifying content for display in an above-the-fold region of the document; and
      prioritizing processing of the content of the document such that the identified content for display in the above-the-fold region is processed before processing content for display outside the above-the-fold region.

12. The method of claim 1, wherein receiving the requested metadata for the document from the second source comprises receiving non-displayable content of the document from the second source without receiving displayable content of the document from the second source in response to the request for metadata.

13. The method of claim 1, wherein requesting the resource of the document from the first source comprises requesting content of a web page from a first web server that hosts the web page, the first web server being associated with a content provider for the web page; and
   wherein requesting metadata for the document from the second source comprises requesting the metadata from a second web server that does not host the web page, the second web server being operated by a third party independently of the content provider and the first web server.

14. The method of claim 1, wherein requesting metadata for the document from the second source comprises sending, to the second source, a metadata request that includes a URL for the document, the second source having access to data storage that includes metadata for documents corresponding to different URLs and different Internet domains; and
   wherein receiving the requested metadata for the document from the second source comprises receiving, from the second source, metadata from the data storage that corresponds to the URL in the metadata request.

15. The method of claim 1, wherein receiving the requested metadata for the document from the second source comprises receiving, from the second source, data that indicates (i) nodes in a document object model tree for the document and (ii) styles corresponding to one or more of the nodes in the document object model tree.

16. A non-transitory computer-readable storage device storing a computer program, the program comprising instructions that when executed by one or more computers cause the one or more computers to perform operations comprising:
   requesting, by a client device and over a network, a resource of a document from a first source;
   before receiving the requested resource, requesting, by the client device and over the network, metadata for the document from a second source that is different from the first source;
   receiving, by the client device, the requested metadata for the document from the second source, wherein the received metadata comprises data indicating characteristics of layout or formatting of the document;
   receiving, by the client device, the requested resource of the document from the first source;
   providing, for display and by the client device, a first representation of the document based on the received metadata from the second source; and
   after providing, for display, the first representation of the document based on the metadata from the second source:
      generating, by the client device, a second representation that combines portions of the first representation with additional portions of the document; and
      providing, for display and by the client device, the second representation that combines portions of the first representation with the additional portions of the document.

17. The computer-readable storage device of claim 16, wherein requesting metadata for the document from the second source that is different from the first source comprises requesting metadata for the document from a second source that is not identified by resources of the document.

18. The computer-readable storage device of claim 16, wherein providing, for display, the first representation of the document based on the received metadata from the second source comprises:
   providing a first representation of the document that includes a displayable element indicated from the received resource of the document at a position and size indicated by the metadata received from the second source.

19. The computer-readable storage device of claim 16, wherein providing, for display, the first representation of the document based on the received metadata from the second source comprises:
   determining, based on the received metadata, a region for display of an element of the document, before receiving resources of the document that indicate the region for display of the element; and
   providing the first representation of the document that reserves a region of the representation for the element.

20. The computer-readable storage device of claim 16, wherein generating the second representation that combines portions of the first representation with the additional portions of the document comprises:
   generating a second representation that adds an additional displayable element of the document in a position and size indicated by the received metadata from the second source.

21. A system comprising:
   one or more computers and one or more storage devices storing instructions that are operable, when executed by the one or more computers, to cause the one or more computers to perform operations comprising:
      requesting, by a client device and over a network, a resource of a document from a first source;
      before receiving the requested resource, requesting, by the client device and over the network, metadata for the document from a second source that is different from the first source;
      receiving, by the client device, the requested metadata for the document from the second source, wherein the received metadata comprises data indicating characteristics of layout or formatting of the document;
      receiving, by the client device, the requested resource of the document from the first source;
      providing, for display and by the client device, a first representation of the document based on the received metadata from the second source; and
      after providing, for display, the first representation of the document based on the metadata from the second source:
         generating, by the client device, a second representation that combines portions of the first representation with additional portions of the document; and
         providing, for display and by the client device, the second representation that combines portions of the first representation with the additional portions of the document.

22. The system of claim 21, wherein requesting metadata for the document from the second source that is different from the first source comprises requesting metadata for the document from a second source that is not identified by resources of the document.

23. The system of claim 21, wherein providing, for display, the first representation of the document based on the received metadata from the second source comprises:
   providing a first representation of the document that includes a displayable element indicated from the received resource of the document at a position and size indicated by the metadata received from the second source.

24. The system of claim 21, wherein providing, for display, the first representation of the document based on the received metadata from the second source comprises:
   determining, based on the received metadata, a region for display of an element of the document, before receiving resources of the document that indicate the region for display of the element; and
   providing the first representation of the document that reserves a region of the representation for the element.

25. The system of claim 21, wherein generating the second representation that combines portions of the first representation with the additional portions of the document comprises:
   generating a second representation that adds an additional displayable element of the document in a position and size indicated by the received metadata from the second source.

26. A method performed by data processing apparatus, the method comprising:
   requesting a resource of a document from a first source;
   before receiving the requested resource, requesting metadata for the document from a second source that is different from the first source;
   receiving the requested metadata for the document from the second source, wherein receiving the requested metadata for the document from the second source comprises receiving, at a client device, data indicating characteristics of the layout or formatting of a prior rendering of the document, wherein the prior rendering was generated by a device that is different from the client device;
   receiving the requested resource of the document from the first source;
   providing, for display, a first representation of the document based on the received metadata from the second source; and
   after providing, for display, the first representation of the document based on the metadata from the second source:
      generating a second representation that combines portions of the first representation with additional portions of the document; and
      providing, for display, the second representation that combines portions of the first representation with the additional portions of the document.

\* \* \* \* \*